United States Patent
Compare et al.

(10) Patent No.: US 8,099,101 B2
(45) Date of Patent: Jan. 17, 2012

(54) METHOD AND SYSTEM FOR THE AUTOMATED MANAGEMENT OF COMMUNICATION SERVICES ON BOARD A SHIP

(75) Inventors: Daniele Compare, L'Aquila (IT);
Rossella Flammini, L'Aquila (IT);
Alberto Guerrieri, Antrodoco (IT)

(73) Assignee: Selex Communications S.p.A., Genoa (IT)

( * ) Notice: Subject to any disclaimer, the term of this patent is extended or adjusted under 35 U.S.C. 154(b) by 237 days.

(21) Appl. No.: 12/663,404

(22) PCT Filed: Jun. 8, 2007

(86) PCT No.: PCT/IT2007/000407
§ 371 (c)(1),
(2), (4) Date: Dec. 7, 2009

(87) PCT Pub. No.: WO2008/149394
PCT Pub. Date: Dec. 11, 2008

(65) Prior Publication Data
US 2010/0173662 A1   Jul. 8, 2010

(51) Int. Cl.
*H04W 72/00* (2009.01)
(52) U.S. Cl. .............. 455/452.1; 455/450; 455/451; 455/452.2; 455/453; 455/561; 455/507; 455/509; 455/512; 455/513; 455/436; 455/438; 709/223; 709/224; 709/226; 709/229; 370/329; 370/331; 370/332; 370/333

(58) Field of Classification Search .......... 455/450, 455/451, 452.1, 452.2, 453, 436, 438–446, 455/507–515, 561, 67.11, 67.13; 709/220–229; 370/329–333
See application file for complete search history.

(56) References Cited

U.S. PATENT DOCUMENTS

| | | | |
|---|---|---|---|
| 6,023,622 A * | 2/2000 | Plaschke et al. | 455/452.2 |
| 6,115,646 A | 9/2000 | Fiszman et al. | |
| 6,463,279 B1 * | 10/2002 | Sherman et al. | 455/427 |
| 7,603,212 B2 * | 10/2009 | Ariyur et al. | 701/23 |
| 7,808,952 B2 * | 10/2010 | Duan et al. | 370/335 |
| 7,978,670 B2 * | 7/2011 | Chiricescu et al. | 370/338 |
| 8,005,046 B2 * | 8/2011 | Salmenkaita et al. | 370/330 |

OTHER PUBLICATIONS

Ghedira "Distributed Simulated Re-annealing for Dynamic Constraint Satisfaction Problems" Tools with artificial intelligence, 1994 Proceedings. Sixth International Conference on New Orleans, LA, Nov. 6-9, 1994, pp. 601-607.

(Continued)

*Primary Examiner* — Tuan A Tran
(74) *Attorney, Agent, or Firm* — Merchant & Gould P.C.

(57) ABSTRACT

A method for the automated management of services envisaged by a predetermined communications plan of a telecommunication system on-board a ship includes radiocommunication resources. The method defines static constraints or criteria, indicates the nominal characteristics of the resources forming part of the on-board system, and dynamic constraints or criteria, and indicates the state of use and the current operating conditions of the resources. The method also includes searching for a resource adapted to perform a service required, on the basis of the static constraints; checking for availability of the resource on the basis of the dynamic constraints; assigning the resource to the service required, if it is available, or otherwise assigning a different resource available, selected on the basis of the static and dynamic constraints or criteria.

10 Claims, 2 Drawing Sheets

OTHER PUBLICATIONS

Hafid et al. "A network management prototype for information delivery and planning with quality of service guarantees." Milcom 2000. 21$^{st}$ Century Military Communications Conference Proceedings, Oct. 22-25, 2000, Piscataway, NJ. pp. 1026-1030.

Schiex et al. "Nogood Recording for static and dynamic constraint satisfaction problems." Tools with artificial intelligence, 1993 proceeds. Fifith International Conference on Boston, MA, Nov. 8-11, 1993, pp. 48-55.

Wu "Knowledge Object Modeling." Transactions on Systems, Man and Cybernetics. Part A: Systems and Humans, IEEE Service Center, Piscataway, NJ. vol. 30, No. 2, Mar. 2000, pp. 96-107.

* cited by examiner

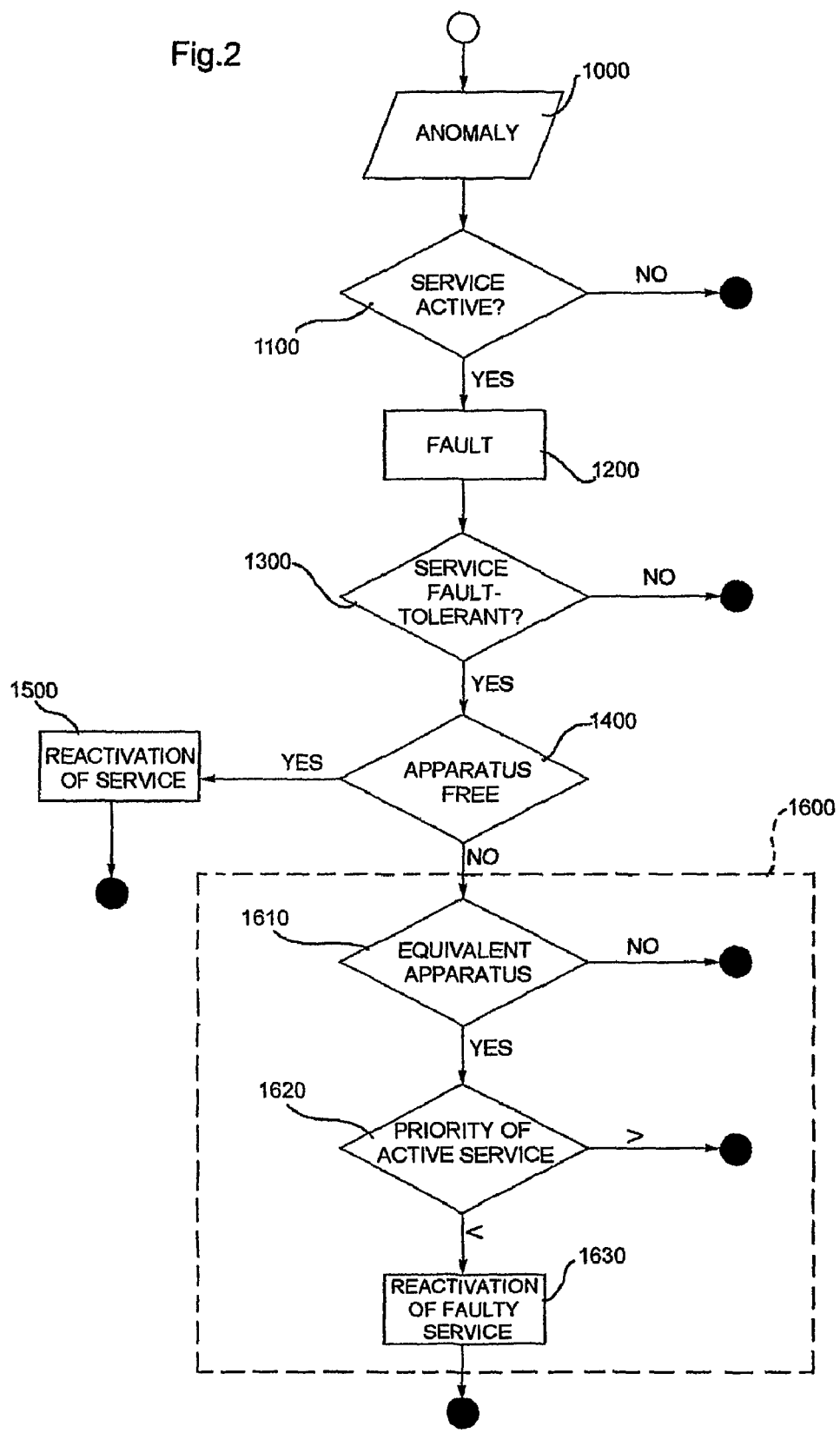

METHOD AND SYSTEM FOR THE AUTOMATED MANAGEMENT OF COMMUNICATION SERVICES ON BOARD A SHIP

This application is a National Stage Application of PCT/IT2007/000407, filed 8 Jun. 2007 and which application is incorporated herein by reference. To the extent appropriate, a claim of priority is made to the above disclosed application.

The present invention relates to the management of telecommunication services on-board a naval unit and, more specifically, to a method and a system for the automated management of the telecommunication services envisaged by a predetermined communications plan.

BACKGROUND

In connection with the operativity of a naval fleet during a mission, it is necessary to specify and use a common communications plan which allows direct interaction between the various naval units and other stations or units, for example land bases, air support units and the like.

This communications plan envisages the definition of a plurality of communications services which can be provided by means of a bundle of apparatus with different characteristics, comprising data and voice services in the VHF, UHF, HF, SHF or UHF SAT bands, in encrypted or unencrypted form, which must be activated rapidly, i.e. within a few seconds. These services must be provided using the limited communications resources of a naval unit and, if necessary, the simultaneous use of these resources, together with any equipment faults, must also be managed.

At present a manual technique is used for activating/reactivating the communications services, this technique having the disadvantage that it must be based on memorisation of the chosen configurations of the apparatus (chains of devices and/or apparatus in the transmission and reception channels) by the operator and on manual calculation using a heuristic process or a tentative approach, of the configuration most appropriate for each particular transmission and fault situation from among the many possible configurations.

The object of the present invention is to provide a method and a system adapted to allow the automated management of the communications services on-board a ship, and in particular adapted to perform analyses and predictions as to the feasibility and the method of implementing these services.

SUMMARY OF THE INVENTION

Conveniently, according to the novel idea of the invention, it is possible to select in a completely automatic manner the optimum chain of devices and/or radio and communications equipment (for example encrypting devices, modems, interconnection interfaces) in the transmission and reception channels, to be used in order to provide the communication services required by the operativity of the naval unit, on the basis of constraints or criteria which are both of a static nature, namely are predefined by the user during the planning stage, these being representative of the types of devices and/or apparatus forming the system, their nominal operating parameters and specifications, the predefined assignment of devices and/or apparatus to predetermined services and the operating parameters required by them, and of a dynamic nature, these being representative of the operative state of the entire communications system, namely the state of use of the apparatus as well as their operating condition (faulty, not responding, busy, etc.).

The calculation is performed in order to achieve an assignment of the resources such as to activate all the services required when possible. In the case where the communications services are more than one in number, they are considered in an order which is determined by a priority associated with them and by the static constraints specified by the user during planning, for example the use of a particular type of apparatus or a specific apparatus for providing a given service, the choice of a particular transmission power to be used during activation of a given service, etc.

It is also taken into account the current operating state of the system, namely knowledge of the presence of apparatus already used by active services, the presence of apparatus which are not available because they are faulty or inaccessible, etc.

In the event of conflicts, should there not be adequate communications resources, the method according to the invention is adapted to assist an operator (or also, where permitted, take the place of the operator) with regard to the choice of services to be deactivated, in order to free resources to be assigned to services which are regarded as high-priority, or services which are not to be activated.

Since on-board a naval unit it is possible to use also radio carriers which are highly reconfigurable, for example the HF multichannel, the method according to the invention takes into account also this further computational complication, establishing which configuration of the reconfigurable radio carriers is moist suited for maximisation and optimisation of use (for example, as regards the maximum power available per channel or the maximum number of channels which can be used simultaneously).

Advantageously, with the method according to the invention it is possible to considerably speed up and simplify the management of the communications services on-board a ship, ensuring an extremely high reactivity of the system in connection with the operativity of the ship.

The main advantage of use of the solution according to the invention compared to the known manual techniques consists in the greater reliability and speed of the process of activating/reactivating the communication services with reduced action on the part of an operator, who is no longer required to have to memorise and remember the previously chosen configurations of the communications plan, nor manually calculate using a tentative method the configuration which is most suited for the occurring situation.

BRIEF DESCRIPTION OF THE DRAWINGS

Further characteristic features and advantages of the invention will be explained in greater detail in the detailed description which follows of an embodiment thereof, provided by way of a non-limiting example, with reference to the accompanying drawings in which:

FIG. 2 is a flow diagram of a procedure for automatically/reactivating a fault-tolerant service.

DETAILED DESCRIPTION OF THE PREFERRED EMBODIMENTS

Figure 1:
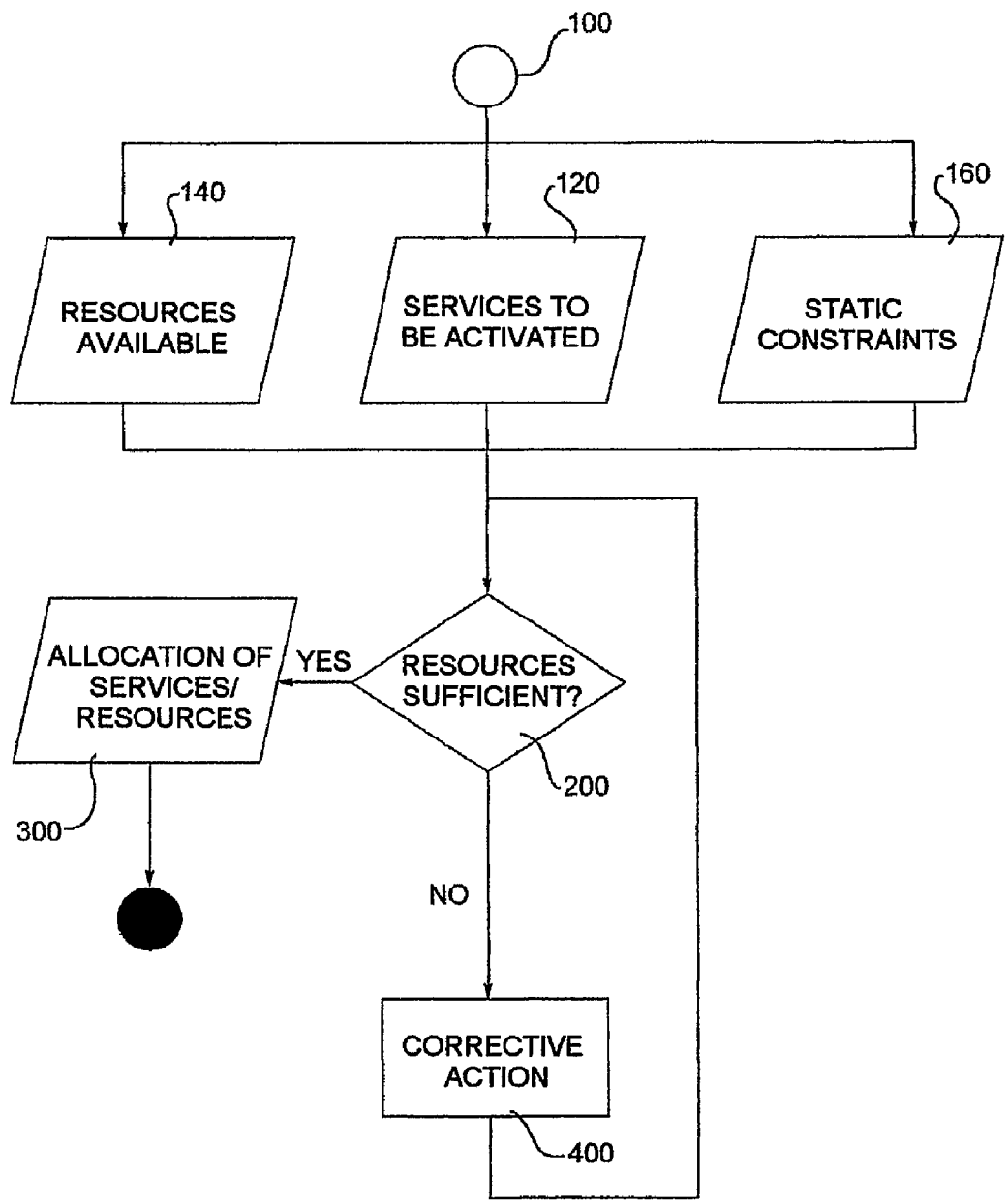
FIG. 1 is a high-level flow diagram illustrating the method according to the invention.

With reference to FIG. 1 it is shown in its entirety a high-level flow diagram illustrating the method according to the invention.

This method is designed to be implemented by means of a processing system comprising one or more processing modules, which is adapted to execute a processing program or set of programs stored on a medium or accessible within a telematic network.

Upon activation of the system at step 100 a series of operations for checking the data previously introduced during a planning stage are performed, in parallel or in sequence, i.e. specifically, at step 120, the check of all the communications Services to be activated, including, for each of them, indication of the fault-tolerant-services and indication of the priority levels of the services, at step 140, the check of the state of the current communications resources available at step 160, the check of the static constraints to using of the available resources previously introduced during the planning stage.

The data relating to whether a service is fault-tolerant can be introduced into the system during the services planning stage by the operator, for example by means of a boolean flag. The data relating to the priority levels of the services can also be introduced into the system by an operator during the planning stage, for example by classifying them according to four levels (high, medium, normal, low).

A check as to whether there exist sufficient communications resources which can be used for providing all the required services is then performed at step 200.

If the outcome of the check is positive, the system performs allocation of the available resources to the services at step 300 in accordance with the predefined communications plan. If the outcome is negative, the system proposes corrective/actions to the user at step 400 and, following the choices made by the latter, carries out a new check as to availability of the resources for the services required, as in step 200. It may obviously be envisaged that, alternatively, the system itself, if it is enabled to do so, may perform autonomously these corrective actions.

The system preferably supports in an assisted mode, therefore, an operator responsible for management of the telecommunications services on-board a naval unit during activation of a predetermined communications plan composed of a plurality of communications services which involve a plurality of apparatus (several tens of services involving hundreds of apparatus), preventing conflicts of resources and taking into account both the static constraints of use specified by the user and intrinsic within the apparatus and the dynamic constraints which are in turn determined by the operating state of the system apparatus.

In the case where the system detects an anomaly, a fault or the non-available state of an apparatus involved in a communications service in use, if required during planning (namely if the service is identified as being fault-tolerant, for example because it is considered to be critical), the system according to the invention is able to perform reactivation of the service in a transparent and possibly completely automatic manner, without any action on the part of the operator, performing the selection of alternative apparatus equivalent to those which can no longer be used, provided that they are available, and thus minimising the actual non-availability of the service which is considered to be critical.

This procedure is described below with reference to the flow diagram shown in FIG. 2.

Upon occurrence of an operating anomaly or a fault in an apparatus involved in the provision of a communications service and consequent detection of this anomaly or fault by the system during a cyclical check of the operating state of the apparatus at step 1000, the system checks whether this apparatus is currently being used by an active service (step 1100).

If this is not the case, the system ends the procedure, possibly updating the dynamic constraints of the communication system, while if the answer is affirmative, it identifies the service concerned as being faulty at step 1200.

Subsequently at step 1300 it is checked whether the service identified as being faulty is required by the communications plan as a fault-tolerant service.

If this is the case, the system checks, at step 1400, for the existence of a different apparatus (or chain of devices and/or apparatus) which has equivalent characteristics and is free and utilisable. In the affirmative, the system manages reactivation of the service by means of the new apparatus (step 1500). In the negative, the system passes to step 1600 where it awaits manual action by the operator.

If the operator wishes to reactivate the service in question, he/she is assisted by the system which checks at step 1610 or the existence of a different equivalent apparatus (or chain of devices and/or apparatus) currently used by another service and, if the existence of this apparatus is identified, it carries out a further check at step 1620 as to whether the active service using this apparatus has a priority which is lower or higher than the service interrupted as a result of the fault.

For example, the system is arranged to list all the currently active services which may potentially be replaced, ordered by priority.

In the case where the currently active service has a lower priority man the service interrupted as a result of the fault, the system is arranged to suggest deactivation of the service in progress (or autonomously performs deactivation of the service, where this possibility is envisaged) and reactivation of the service which is temporarily faulty, taking advantage of the operativity of the chosen apparatus (step 1630).

Conveniently, owing to the operating context which is in real time or "quasi real time" and for critical missions, the system has very high performance characteristics, being able to perform the activation and reactivation of services within the space of a few seconds, and also offers a high level of reliability with regard to establishing the various communication services, so as to ensure, for example, correct use/ thereof in military missions.

The methods used for representing the communications plan and for reconfiguring the services involve consulting a graph representing the space of all the possible solutions from which optimum solutions are searched for, depending on the constraints specified during the planning stage, the "optimum" condition being understood as referring to the situation where all the constraints are satisfied.

In connection with the operativity of the naval unit it is possible to define a list of "schemes" for implementing the telecommunication services, i.e. predefined models which detail how a particular service must be implemented in terms of the exact sequence of apparatus to be interconnected. The system refers to these predefined models during its assessments.

Obviously, without modifying the principle of the invention, the embodiments and the constructional details may be widely varied with respect to that described and illustrated purely by way of a non-limiting, example, without thereby departing from the scope of protection of the present invention, defined by the accompanying claims.

The invention claimed is:

1. Method for the automated management of a plurality of services envisaged by a predetermined communications plan of a telecommunication system on-board a naval unit comprising a plurality of radiocommunication apparatus, the method comprising:

defining static constraints or criteria during a planning stage, representative of the apparatus forming part of the on-board system, including a respective first set of data indicating the nominal operating parameters of said apparatus and a respective second set of data indicating the predefined assignment of said apparatus to predetermined services;

defining dynamic constraints or criteria during a planning stage, representative of the current operating state of said apparatus, including a respective first set of data indicating the state of use of the apparatus by active services and a respective second set of data indicating the operating condition of the apparatus;

acquiring a request for activation of a service;

searching for a communications resource including a combination of apparatus, adapted to perform the service required on the basis of said static constraints associated with the selected apparatus;

checking for availability of the resource, on the basis of said dynamic constraints associated with the selected apparatus; then:

if the resource is available, assigning said resource to the service required;

if the resource is not available, assigning a different resource including a different combination of apparatus available for the service required, selected on the basis of said static constraints or criteria and said dynamic constraints or criteria, wherein the assignment of the resources available on the basis of said static and dynamic constraints to the services required is performed in accordance with a priority criterion associated with the services by an operator during the planning stage, and in the event of there being no free resources, resolving conflicts relating to the assignment of resources in accordance with a predetermined criterion, including checking existence of a different resource currently used by another service and, where the currently active service has a lower priority than the service required, suggesting to a human operator assignment of the occupied resource to the service with a higher priority and deactivation of a previous active service with a lower priority, wherein the combination of available apparatus forming a communications resource is performed by consulting a graph representing space of all possible combinations of apparatus and selecting an optimum solution on the basis of constraints specified, the optimum condition being defined as that where all the constraints are satisfied.

2. Method according to claim 1, wherein each communications resource includes a combination of apparatus comprising devices for generating, processing and transmitting/receiving signals.

3. Method according to claim 1, comprising an assignment of predetermined resources to respective predetermined services in accordance with predefined planning constraints of the system.

4. Method according to claim 1, comprising an assignment of predetermined nominal operating parameters of a resource to respective predetermined services in accordance with predefined planning constraints of the system.

5. Method according to claim 4, wherein the assignment of predetermined nominal operating parameters of a resource to a service comprises reconfiguring multichannel radio carriers of predetermined resources for optimisation of their use.

6. Method according to claim 5, comprising an assignment of a predetermined transmission power for each channel.

7. Method according to claim 5, comprising simultaneous activation of a plurality of parallel channels.

8. Method according to claim 1, comprising the detection of the non-availability of a resource and assignment of an alternative resource to a critical communication service identified as being fault-tolerant, where assignment of a resource which is already occupied is performed in accordance with said predetermined criterion for the resolution of conflicts.

9. Processing system for the automated management of a plurality of services envisaged by a predetermined communications plan of a telecommunications system on-board a naval unit, comprising a plurality of radiocommunication resources, programmed to carry out a method for the automated management of a plurality of services according to claim 1.

10. A processing system, comprising a processing program or set of programs having one or more code modules which can be executed by the processing system for implementing a method for the automated management of a plurality of services envisaged by a predetermined communications plan of a telecommunication system on-board a naval unit, according to claim 1.

* * * * *